Patented May 16, 1944

2,349,191

UNITED STATES PATENT OFFICE 2,349,191

MANUFACTURE OF SULPHUR DERIVATIVES OF ORGANIC COMPOUNDS

John F. Olin and Thomas E. Deger, Grosse Ile, Mich., assignors to Sharples Chemicals Inc., a corporation of Delaware No Drawing. Application January 21, 1941, Serial No. 375,366

4 Claims. (Cl. 260—608)

The present invention pertains to the manufacture of chemical compounds consisting of two organic radicals linked by a sulphur chain consisting of two or more sulphur atoms. While the invention may be practiced in the manufacture of compounds of this type in which the organic radicals are alkyl, aryl, aralkyl, cycloalkyl, or heterocyclic, it was conceived as the result of research to develop an economical method of producing dibenzyl disulphide. It will accordingly be discussed with reference to that problem, with the understanding that it may be applied in the manufacture of polysulphide derivatives of other aralkanes or of the various other organic compounds discussed above.

In the manufacture of dibenzyl disulphide by prior art methods, it has been customary to react benzyl chloride with an alkali metal compound of the type of disodium disulphide, in accordance with the following equation:

1. 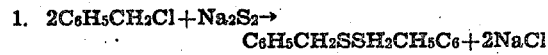

Various procedures have been proposed for applying this reaction. Thus, some of these proposals have been as follows:

(a) That the reaction be conducted in an ethyl alcohol solution.

(b) That the reaction be accomplished in an aqueous medium, followed by performance of special purification steps on the resulting reaction mixture.

(c) That the reaction be conducted in a heterogeneous mixture obtained by dissolving the disodium disulphide in water and dissolving the benzyl chloride in an organic solvent such as alcohol, and then mixing the two solutions to obtain the desired reaction.

These processes leave something to be desired from the standpoint of both economy and purity of product, and the object of the present invention has been to provide a process which constitutes an improvement over the prior art in these particulars. Prior art processes have provided a reaction product which contains a substantial proportion of impurities, with the result that it has an objectionable red or pink color. A feature of the present invention consists in the fact that the product is free of the impurities which result in this red or pink coloration, the product obtained by the process of this invention being practically colorless.

In the practice of the invention, instead of sulphurizing the benzyl chloride in a single step, the operator first converts the benzyl chloride into benzyl mercaptan by sulphydrolysis and then converts the mercaptan to dibenzyl disulphide by oxidation of the mercaptan, as will be evident from the following equations, in which X represents an oxidizing agent:

2. $C_6H_5CH_2Cl + NaSH \rightarrow C_6H_5CH_2SH + NaCl$

3. $2C_6H_5CH_2SH + X \rightarrow C_6H_5CH_2SSH_2CH_5C_6 + H_2X$

In the preferred form of the invention, sulphur is used as the oxidizing agent, and Equation 3 may be represented as follows:

4. 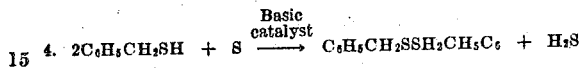

A particular feature of the practice of the invention in its preferred form consists in the fact that the benzyl chloride is first reacted with an alkali metal hydrosulphide in a reaction mixture containing a molecular excess of the hydrosulphide (Equation 2 above), and that sulphur is then added to the reaction mixture to effect oxidation thereof without first removing the excess alkali metal hydrosulphide. By operating in this manner, a dual advantage is obtained. In the first place, by using a molecular excess of the hydrosulphide in Equation 2, the reaction is caused to proceed rapidly to the right. This advantage might under ordinary circumstances be somewhat counterbalanced by added difficulty due to the necessity of added purification expense in removal of excess alkali metal hydrosulphide, but by using the excess hydrosulphide to catalyze the ensuing oxidation reaction, we turn this apparent disadvantage into an actual advantage.

It is not necessary to maintain a large amount of alkali metal hydrosulphide in the reaction mixture when the benzyl mercaptan is oxidized in accordance with Equation 4, since the function of this constituent is catalytic, and it accordingly performs this function even though it may be present in an amount which is far short of a stoichiometric equivalent of the constituents to be reacted.

In the detailed performance of the invention, the benzyl chloride, which may be employed in the purified form or in the form of a crude reaction mixture consisting of benzyl chloride and toluene as obtained in the chlorination of toluene, may be slowly added to an aqueous sodium hydrosulphide solution, while heating the solution to a temperature between 70 and 95° C. and stirring the mixture. The stirring and heating are preferably continued for a period between one and five hours, until the benzyl chloride has been substantially completely converted into the mercaptan (Equation 2).

If the reaction mixture were allowed to settle, it would separate into two layers, an upper oil layer consisting essentially of benzyl mercaptan or a mixture of benzyl mercaptan with toluene, and a lower aqueous layer consisting of a solution of salt and sodium hydrosulphide. But instead of separating the aqueous solution at this point, it is retained in the mixture while sulphur is added in sufficient quantity to oxidize (sulphurize) the benzyl mercaptan to produce the desired dibenzyl disulphide at a temperature of 70 to 95° C. with stirring. Stirring and heating are continued for a period between one and five hours in order to complete the reaction of Equation 4.

Hydrogen sulphide evolved in accordance with Equation 4 may be absorbed in a sodium sulphide or sodium hydroxide solution (see Clark Patent 2,147,400), in order to regenerate sodium hydrosulphide for use in subsequent practice of the steps of Equation 2.

After the reaction between the sulphur and benzyl mercaptan has been substantially completed to convert the mercaptan into the corresponding dibenzyl disulphide, the crude reaction product may be washed with water to remove most of the salt and then steam distilled in the presence of a small amount of a base to completely remove traces of benzyl mercaptan and toluene. The residue of dibenzyl disulphide and the base is washed several times with water to remove water soluble constituents of the mixture. The wet dibenzyl disulphide may then be dried under vacuum at about 80° C. and filtered to remove dirt and other insoluble constituents. The final product is a fairly hard crystalline mass melting between 65 and 68° C. It gives a negative copper corrosion test result even when treated for one hour at 200° F.

The following specific examples afford further illustrations of the practice of the invention.

Example I 1120 lbs. of 38.7% aqueous sodium hydrosulphide are charged into a jacketed steel reactor equipped with an agitator, thermometer well and other necessary vents for carrying out the process. The reactor is then heated to 85° C. by means of the steam jacket at which temperature 873 lbs. of 98% benzyl chloride are charged in over a period of 2.75 hours. This mixture is then digested at 85–95° C. for 6.0 hours. After digestion the benzyl chloride is substantially converted to benzyl mercaptan as shown by the fact that the oil layer analyzes 90% benzyl mercaptan. Without removing the aqueous layer from the digester 100 lbs. sulphur are added over a period of 3 hours at 85–90° C. This phase of the process is done in a closed system so that the hydrogen sulphide that is formed can be absorbed in a system of three gas scrubbers in series containing approximately 27% sodium hydroxide solution. The hydrogen sulphide is completely absorbed and none escapes to contaminate the atmosphere. The sodium hydrosulphide solution formed in the scrubbers may be used in subsequent batches for the production of the mercaptan. The slight molar excess of sodium hydrosulfide added at the beginning serves as a catalyst during the oxidation of the benzyl mercaptan with sulphur. After all the sulphur is added the mixture is heated for 6 hours at 90–95° C. with stirring. 120 lbs. 50% sodium hydroxide are added and the mixture is wet distilled at approximately 40 mm. pressure. This step serves to remove traces of unreacted benzyl chloride and benzyl mercaptan from the dibenzyl disulphide. About 100 gallons of distillate are collected containing approximately ½ gallon oil layer. The heavy water layer containing sodium chloride, sodium hydrosulphide, sodium hydroxide and traces of sodium benzyl mercaptide is removed from the dibenzyl disulphide oil layer. The oil layer is then washed four times with approximately 250 gallon portions of water while maintaining it in a molten state at 65–85° C. to remove soluble inorganic material. The water layers are separated after the benzyl disulphide has been cooled and crystallized in order to aid in more complete removal of the water layer. After the last water wash, the wet dibenzyl disulphide is dried by vacuum at 80° and 30 mm. pressure. While still in the molten state it is passed through a filter press to remove dirt and iron sulfide. The filtrate is allowed to cool and solidify in appropriate shipping containers. The product thus obtained is an almost white or very light pink, hard, crystalline solid melting at 67.5° C. and non-corrosive to copper on contact up to 45 minutes at 200° F. 766 pounds finished dibenzyl disulfide are obtained in a 96% yield based on benzyl chloride added.

Example II 124 grams benzyl mercaptan and 1 gram triethylamine are placed in a flask equipped with a mercury seal stirrer, thermometer well, catalyst adder, and reflux condenser attached to a scrubbing tower in which 20% sodium hydroxide flows counter current to the stream of gas. After heating to 85° C., 16 grams sulphur are added over a period of ½ hour. The hydrogen sulphide passes through the reflux condenser and is absorbed in the sodium hydroxide solution. The crude product is washed once with 10% sodium hydroxide solution followed by three washes with water at 80–80° C. After drying at 80° C. under 30 mm. pressure the molten dibenzyl disulphide is filtered to remove dirt and allowed to cool and crystallize. A product consisting of 122 grams of pure dibenzyl disulphide, almost white in color and melting at 67° C. is obtained. The yield based on benzyl mercaptan is 99%.

Various modifications will be obvious to those skilled in the art. For example, while a feature of the invention consists in the use of the excess alkali metal hydrosulphide employed in sulphydrolysis as the catalyst for the ensuing oxidation and sulphurization reaction, the invention may be practiced by sulphurizing the benzyl mercaptan with the aid of other catalysts as exemplified by the procedure of Example II, above.

While the invention has particular utility in the manufacture of di-aralkyl disulphides (e. g., dibenzyl disulphide), because of the ease with which compounds of this type enter into metathetical reactions (e. g., the sulphydrolysis of benzyl chloride), the principles of the invention may be applied in sulphydrolysis of various organic chlorides and oxidation of the resulting mercaptans, as indicated in the introductory remarks of this specification.

We wish it to be understood that the invention is not to be limited by the details of the procedure discussed above, as these details are purely illustrative, and that the invention is to be limited only by the scope of the following claims.

We claim:
1. In the manufacture of polysulphide compounds of the type represented by the formula RSSR, wherein R represents an aralkyl radical, the process comprising reacting the corresponding aralkyl halide with an alkali metal hydrosulphide in the presence of a quantity of said alkali metal hydrosulphide in excess of a stoichiometric equivalent of the quantity of aralkyl halide treated to produce a mercaptan and thereafter oxidizing the mercaptan of the resulting reaction mixture in the presence of sulphur and unreacted alkali metal hydrosulphide of said reaction mixture to produce the desired polysulphide.

2. In the manufacture of di-aralkyl polysulphides, the process comprising reacting an aralkyl halide with an alkali metal hydrosulphide in the presence of a quantity of said alkali metal hydrosulphide in excess of the quantity of aralkyl halide under treatment to produce a mercaptan, and thereafter oxidizing the mercaptan of the resulting reaction mixture in the presence of sulphur and unreacted alkali metal hydrosulphide of the reaction mixture to produce the desired polysulphide.

3. In the manufacture of dibenzyl disulphide, the process comprising reacting a benzyl halide with an alkali metal hydrosulphide in the presence of a stoichiometric excess of said alkali metal hydrosulphide to produce a mercaptan and thereafter oxidizing the mercaptan of the resulting reaction mixture in the presence of sulphur and unreacted alkali metal hydrosulphide of the reaction mixture to produce the desired polysulphide.

4. In the manufacture of dibenzyl disulphide, the process comprising reacting an alkali metal hydrosulphide with a benzyl halide in admixture with toluene in the presence of a stoichiometric excess of said alkali metal hydrosulphide to produce a benzyl mercaptan and thereafter oxidizing the benzyl mercaptan of the resulting reaction mixture in the presence of sulphur and unreacted alkali metal hydrosulphide of said reaction mixture to produce the desired dibenzyl disulphide, and finally removing toluene from the dibenzyl disulphide formed by the oxidation reaction.

JOHN F. OLIN.
THOMAS E. DEGER.

CERTIFICATE OF CORRECTION.

Patent No. 2,349,191.  May 16, 1944.

JOHN F. OLIN, ET AL.

It is hereby certified that error appears in the printed specification of the above numbered patent requiring correction as follows: Page 2, second column, line 44, for "80-80° C." read --70-80° C.--; and that the said Letters Patent should be read with this correction therein that the same may conform to the record of the case in the Patent Office.

Signed and sealed this 4th day of July, A. D. 1944.

Leslie Frazer

(Seal)  Acting Commissioner of Patents.